United States Patent
Lyu et al.

(10) Patent No.: US 6,369,926 B1
(45) Date of Patent: Apr. 9, 2002

(54) MULTICHANNEL LIGHT SOURCE WAVELENGTH AND STRENGTH STABILIZING APPARATUS AND METHOD THEREOF

(75) Inventors: Gap Youl Lyu, Kyunggido Uijungbu; Hyun Jae Lee, Daejeon; Seo Yeon Park, Daejeon; Jong Hyun Lee, Daejeon, all of (KR)

(73) Assignees: Electronics and Telecommunications Research Institute, Daejeon; Korea Telecom, Seoul, both of (KR)

( * ) Notice: Subject to any disclaimer, the term of this patent is extended or adjusted under 35 U.S.C. 154(b) by 0 days.

(21) Appl. No.: 09/136,714

(22) Filed: Aug. 19, 1998

(30) Foreign Application Priority Data

Nov. 27, 1997 (KR) ............................................. 97-63396

(51) Int. Cl.[7] .............................................. H04B 10/04
(52) U.S. Cl. ............................. 359/187; 372/32; 372/34
(58) Field of Search ................................. 359/124, 187; 372/32, 34

(56) References Cited

U.S. PATENT DOCUMENTS 4,410,273 A * 10/1983 Mantz et al. ................ 356/319
5,706,301 A * 1/1998 Lagerstrom .................. 372/32
6,043,915 A * 3/2000 Giles et al. .................. 359/132
6,111,681 A * 8/2000 Mizrahi et al. .............. 359/187
6,144,025 A * 11/2000 Tei et al. ..................... 250/226
6,185,233 B1 * 2/2001 Moothart et al. ............. 372/32

* cited by examiner

*Primary Examiner*—Knife-Michael Negash
(74) *Attorney, Agent, or Firm*—Cohen, Pontani, Lieberman & Pavane

(57) ABSTRACT

A multichannel light source wavelength and strength stabilizing apparatus and a method thereof are disclosed. The apparatus includes a first proportional/integrator for receiving an output signal from the error detector, detecting a value proportional thereto, integrating the detected proportional value, generating a signal corresponding to the optimum feedback circuit, and outputting to the temperature controller; a current controller for providing the current capable of controlling the light strength in accordance with the signal inputted to the light source and stabilizing the light strength; a second optical coupling unit for dividing the output signal from the first optical coupling unit; a photodetector for converting the strength of a light among the output signals from the second optical coupling unit into an electrical signal; and a second proportional/integration unit for detecting a proportional value of the output signal from the optical detector, integrating the detected proportional value, generating a signal corresponding to the optimum feedback circuit, and outputting to the current controller.

3 Claims, 3 Drawing Sheets

MULTICHANNEL LIGHT SOURCE WAVELENGTH AND STRENGTH STABILIZING APPARATUS AND METHOD THEREOF

BACKGROUND OF THE INVENTION

1. Field of the Invention

The present invention relates to a multichannel light source wavelength and strength stabilizing apparatus and a method thereof, and in particular, to an improved multichannel light source wavelength and strength stabilizing apparatus and a method thereof, which are capable of stabilizing a channel interval, and a center wavelength of a wavelength division multiplexing multichannel light source using a wavelength locker of each channel, as well as a wavelength and light strength of a multichannel light source in which a strength of an output light source is stabilized using an automatic light output controller.

2. Description of the Prior Art

Conventionally, a light multiplexing transmission apparatus is an apparatus for integrating several basic transmission signals to one single optical fiber by an optical method, not electrical method. The amount of the information is determined by the speed of a basic transmission signal speed and the number of signals and a multiplication based on the number of channels.

In addition, a transmission capacity may be exceeded in major transmission intervals due to a gradual increase of demand for a broadband service such as a multimedia, so that a new multiplexing method such as an optical frequency multiplexing method is needed.

The optical frequency multiplexing method is a method in which modulated optical signals outputted from various light sources in the transmitting side are received and then aligned based on a predetermined optical frequency slot for thereby integrating the signals, and the optical signals aligned in each frequency slot are separated and extracted using an optical filter in the receiving side.

The optical frequency multiplexing method is directed to transmitting a large amount of signals, is directed to maximizing the transmission speed per channel differently from the system for a subscriber and then increasing the number of multiplexing channels. The performance of the above-described multiplexing method is determined by the frequency slot which is used for the multiplexing operation.

In the conventional art, as an optical fiber filter, an oscillator is used for generating a frequency slot which is used for a multiplexing operation. Namely, the oscillation frequency is used as a slot.

However, in the above-described conventional art, a multichannel frequency is stabilized using a passing through light. The strength of the passing through light is increased as the number of multiplexing channels is increased. The photodetector which receives a multiplexed passing through light is saturated when receiving a predetermined amount of passing through light, so that a signal reliability is decreased, and it is impossible to obtain a stabilized feed back signal.

In addition, a low frequency signal is applied to a light source for overcoming the above-described problems, and the center frequency of the light source is dithered, and the frequency of each light source is aligned with the oscillation frequency having an optical fiber filter, and the variation level of the dithering is analyzed at each oscillating point by receiving a reflection output using a photodetector and is used as a stabilizing feed back signal. Therefore, an optical frequency multiplexing apparatus capable of implementing multiple channels is used.

FIG. 1 is a block diagram illustrating the construction of a conventional multichannel light source wavelength stabilizing apparatus. As shown therein, an error signal is extracted using a reflection output of an optical fiber filter 17, not a reflection output thereof for thereby increasing a signal-to-noise ratio of an optical signal and maximizing the number of multiplexing light sources.

As shown in FIG. 1, a low frequency signal outputted from a low frequency oscillator 11 of a local oscillator 10 is applied to each light source 13, and a center carrier frequency of the light source 13 is dithered, so that the light source 13 outputs an optical signal having a dithering.

The optical signal having a dithering outputted from the light source 13 is combined to form the n-number of signals by a light combining unit, and a 2×2 light combining unit 15 combines the optical signals outputted from the light source 13, and one output is externally outputted through the optical fiber as the finally aligned (or multiplexed) output. The other output is applied to a 2×1 light combining unit 16 for extracting an error signal which is used for an alignment.

The optical signal applied to the 2×1 light combining unit 16 is applied to an optical fiber filter 17 formed of Fabri-Perot type, and the optical signal having a minimum value at the oscillation point is applied to the photodetector 18 through the 2×1 light combining unit 16 based on the oscillation characteristic of the optical fiber filter 17.

The reflected optical signal applied to the photodetector 18 is converted into an electrical signal and then is applied to an optical frequency stabilizing controller 19, and the stabilizing controller 19 detects an error signal corresponding to an escape at the oscillation point, and the thusly detected error signal is converted into a current value and is applied to the bias of the light source 13.

The center carrier frequency of the light source 13 is aligned to coincide with the oscillation frequency determined by the oscillation length of the oscillator, so that it is possible to obtain an optical frequency-multiplexed output.

In addition, since the 2×1 light combining unit 16 is used for the front portion of the optical fiber filter 17, it is possible to remove Fresennel reflection output which fed back from the output which is not used when using the 2×2 light combining unit 15 and thereby decrease noise.

In the method for controlling the center wavelength and interval of the multichannel light source is directed to maintaining a center wavelength and interval at a free spectral range (FSR) of an interference by locking the wavelength of the light source to various peak values among the oscillation characteristic of one Fabri-Perot type interference unit. When using one oscillator, the structure is simple irrespective of the number of channels. However, the above-described method uses a dithering method thereby causing a complicated electrical structure. In addition, if a failure occurs in the interference unit, it is impossible to maintain a predetermined wavelength for which all channels are set, so that an independent and maintenance characteristic of the channel is not implemented.

SUMMARY OF THE INVENTION

Accordingly, it is an object of the present invention to provide a multichannel light source wavelength and strength stabilizing apparatus and a method thereof which overcome the aforementioned problems encountered in the conventional art.

It is another object of the present invention to provide a multichannel light source wavelength and strength stabilizing apparatus and a method thereof which are capable of stabilizing a channel interval and a center wavelength of a wavelength division multiplexing multichannel light source using a wavelength locker of each channel and stabilizing the strength of an output light source using an automatic power controller for thereby stabilizing a wavelength of a multichannel light source and the strength of light.

It is another object of the present invention to provide a multichannel light source wavelength and strength stabilizing apparatus and a method thereof which provides a multichannel light transmitter used for a wavelength division multiplexing system for converting an electrical signal modulated to a set wavelength wherein a wavelength division multiplexing method is used, which is capable of transmitting a large amount of information without changing the existing optical line.

The wavelength variation of the multichannel transmission unit generates a predetermined variation in a light strength when the light passes through an optical multiplexing/demultiplexing device, causes a nonlinearity for an optical fiber by varying the strength of an output light source of a multichannel optical amplifier of a wavelength division multiplexing, and decreases a signal to noise ratio (SNR) of an optical signal.

Therefore, a technique capable of stabilizing the wavelength of the optical transmitter and the strength of the light source is needed. The oscillation mode of a distributed feedback laser (DFB-LD) which is used as a light source of the optical transmitter is determined based on the variation of the internal deflection ratio in accordance with a temperature variation, and the incoming current changes the output wavelength as the output strength and the internal temperature variation are changed.

According to the recommendation of the ITU-T, the wavelength of the output light source by the channel is allocated to the wavelength having 0.8 nm as a minimum channel interval based on the reference wavelength of 1552.52 nm, and the wavelength variation of the channel-based light source is controlled to be within 0.32 nm in the case of over 1.6 nm in the normal state.

In order to achieve the above objects, there is provided a multichannel light source wavelength and strength stabilizing apparatus which includes a temperature controller for stabilizing a wavelength by controlling a temperature variation of the light source in accordance with a signal inputted; a first coupling unit for dividing an output signal of the light source; a wavelength locker for receiving a light divided by the first optical coupling unit, detecting a wavelength difference between the wavelength of the received light and a set wavelength and converting the detected optical signal into an electrical signal; an error detector for receiving an output electrical signal from the wavelength locker, detecting a sum and difference of the signals, amplifying the sum and difference, dividing the difference by the sum, and generating an error signal which is used for a stabilizing feedback circuit; a first proportional/integrator for receiving an output signal from the error detector, detecting a value proportional thereto, integrating the detected proportional value, generating a signal corresponding to the optimum feedback circuit, and outputting to the temperature controller; a current controller for providing the current capable of controlling the light strength in accordance with the signal inputted to the light source and stabilizing the light strength; a second optical coupling unit for dividing the output signal from the first optical coupling unit; a photodetector for converting the strength of a light among the output signals from the second optical coupling unit into an electrical signal; and a second proportional/integration unit for detecting a proportional value of the output signal from the optical detector, integrating the detected proportional value, generating a signal corresponding to the optimum feedback circuit, and outputting to the current controller.

In order to achieve the above objects, there is provided a multichannel light source wavelength and strength stabilizing method which includes the steps of first setting a temperature and current of the light source; second verifying whether the wavelength and light strength of an externally set light source are satisfied based on the set current and temperature; third setting a new light source temperature and current when the externally set light source wavelength and light strength are not satisfied; and fourth controlling an operational point when the externally set light source wavelength and light strength are satisfied for thereby maintaining a set wavelength and set light strength.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limiting of the present invention, and wherein.

DETAILED DESCRIPTION OF THE INVENTION

Figure 1:
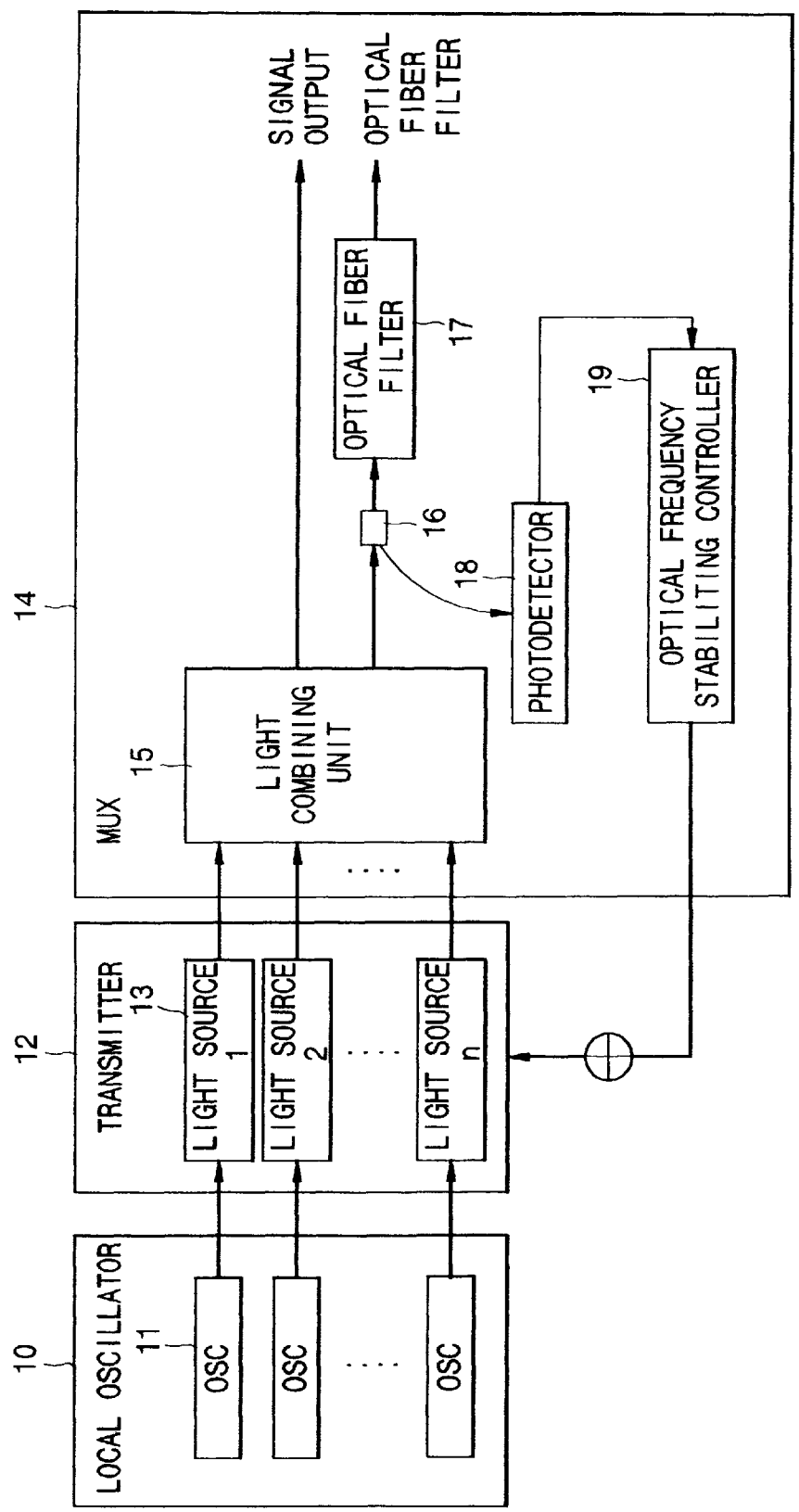
FIG. 1 is a block diagram illustrating the construction of a conventional multichannel light source wavelength stabilizing apparatus.
Figure 2:
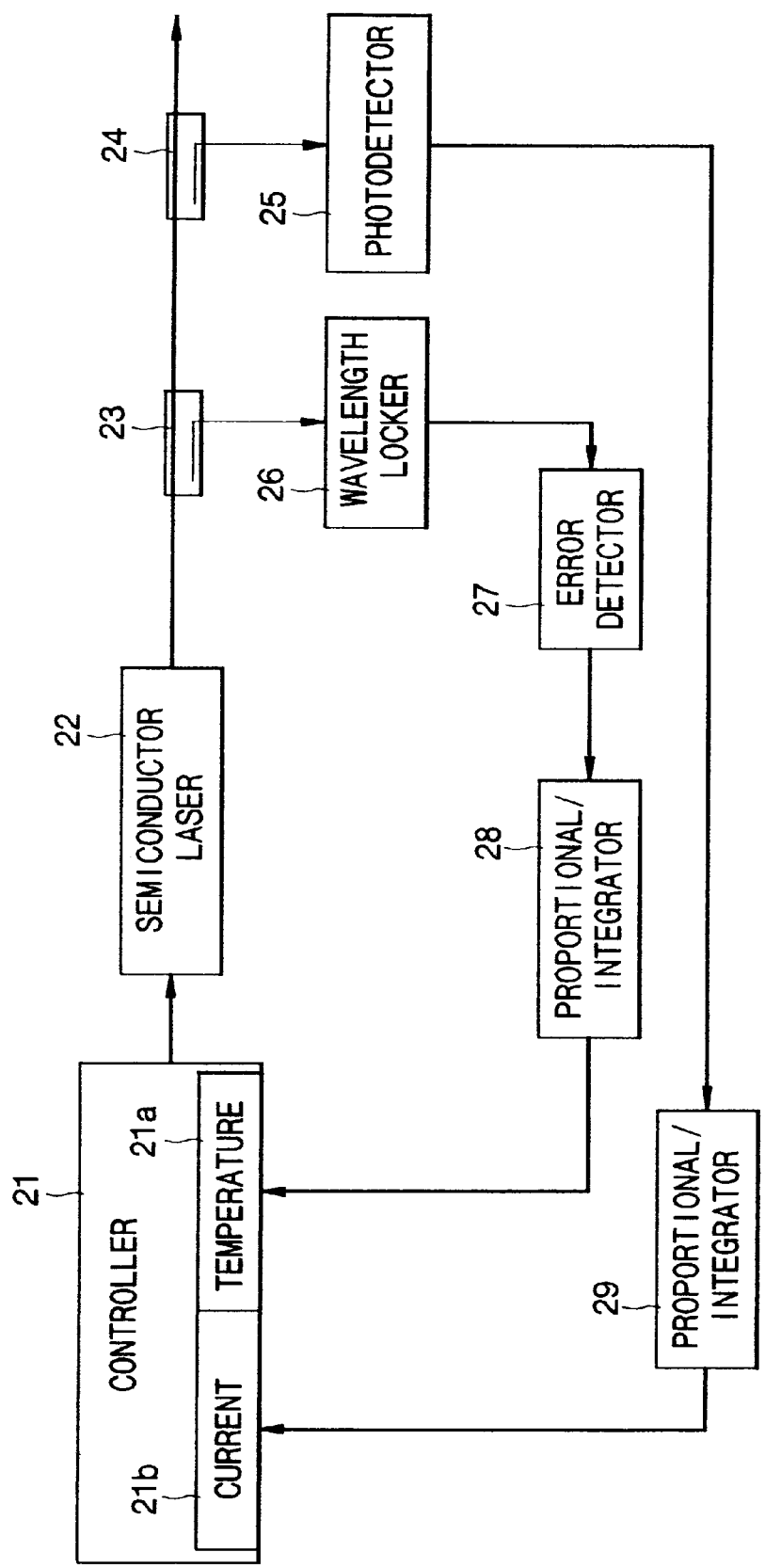
FIG. 2 is a block diagram illustrating a multichannel light source wavelength and strength stabilizing apparatus according to the present invention.

FIG. 2 is a block diagram illustrating a multichannel light source wavelength and strength stabilizing apparatus according to the present invention. As shown therein, a current/temperature controller 21 includes a temperature controller 21b for controlling a temperature variation of a semiconductor laser 22 in accordance with an output signal from a first proportional/integrator 28 for thereby stabilizing a wavelength, and a current controller 21a for supplying the current capable of controlling the light strength in accordance with the output signals from the temperature controller 21b and the second proportional/integrator 29 to the semiconductor laser 22 for thereby stabilizing the light strength.

The semiconductor laser 22 receives a control of the current/temperature controller 21 and output light to the first optical coupler 23.

The first optical coupler 23 divides the output signal from the semiconductor laser 22 and outputs to a wavelength locker 26 and a second optical coupler 24, respectively.

The wavelength locker 26 receives the light divided by the first optical coupler 23, detects a difference between the wavelength of the light source and a preset wavelength, converts the thusly detected optical signal into an electrical signal and outputs to an error detector 27.

The error detector 27 receives an output electrical signal from the wavelength locker 26, detects a sum and a difference between successively received signals, amplifies the detected sum and difference, divides the difference value by the sum value, generates an error signal needed for the stabilizing feedback circuit and outputs to the first proportional/integrator 28.

The first proportional/integrator 28 receives an output signal from the error detector 27, detects a value proportional thereto, integrating the detected proportional value, generating a first input signal corresponding to the optimum feedback circuit and outputs to the temperature controller 21b.

The second optical coupler 24 receives an output from the first optical coupler 23, divides the same, and outputs to the optical fiber and photodetector 25.

The photodetector 25 receives an output signal from the second optical coupler 24, converts the light strength into an electrical signal and outputs to the second proportional/integrator 29.

The second proportional/integrator 29 receives an output signal from the photodetector 25, detects a value proportional thereto, integrates the detected proportional value, generates a second input signal corresponding to the optimum feedback circuit and outputs to the current controller 21a.

Figure 3:
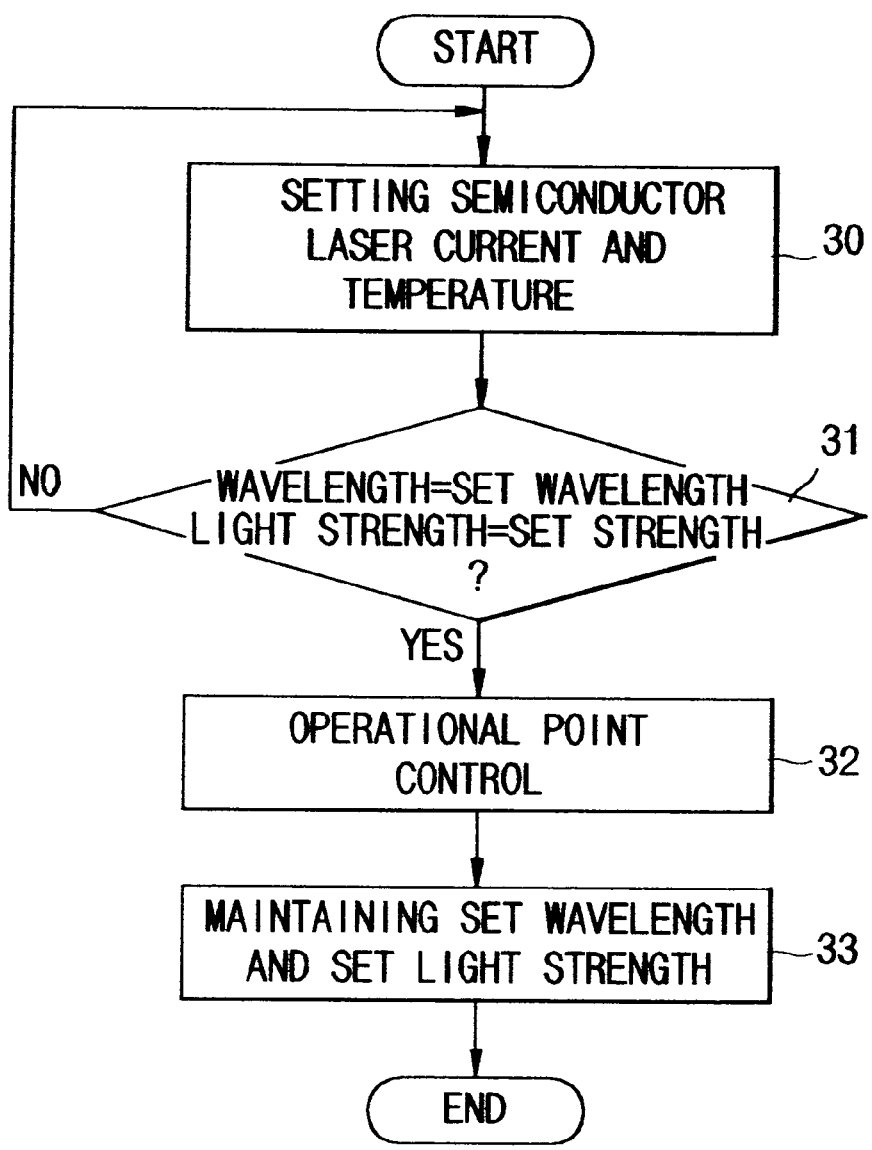
FIG. 3 is a flow chart illustrating a multichannel light source wavelength and strength stabilizing method according to the present invention.

FIG. 3 is a flow chart illustrating a multichannel light source wavelength and strength stabilizing method according to the present invention.

As shown therein, the apparatus which is capable of stabilizing the wavelength and light strength of light output by the multichannel light source sets a temperature and current of the semiconductor laser 22 in step 30.

The apparatus which is capable of stabilizing the wavelength of the multichannel light source and a light strength judges whether it satisfies the wavelength of the light source and the light strength externally set based on the set current and temperature in Step 31, sets a temperature and current of a semiconductor laser when it does not satisfy the wavelength of the light source and a light strength in Step 30, and the operational point is controlled when the externally set light source wavelength and light strength are satisfied in Step 32, and the set wavelength and set light strength are maintained in Step 33.

As described above, in the present invention, it is possible to provide a simple electrical optical structure, maintain a channel-based independence, and implement an easier maintenance method.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In an apparatus capable of stabilizing a wavelength and a light strength of a multichannel light source, the improved apparatus comprising:

temperature control means for controlling a temperature variation of the light source in accordance with a first input signal so as to stabilize the wavelength;

first optical coupling means for dividing an output signal of the light source;

wavelength locking means for receiving a light divided by the first optical coupling means, detecting a wavelength difference between the wavelength of the received light and a set wavelength and converting the detected wavelength difference into a first electrical signal;

error detection means for receiving the first electrical signal, detecting a sum and difference of successive first electrical signals, amplifying the sum and difference, dividing the difference by the sum, and generating an error signal;

first proportional/integrator means for receiving the error signal from the error detection means, detecting a value proportional to the error signal, integrating the detected proportional value, and generating the first input signal for the temperature control means;

current control means for providing the light source with a current for controlling the light strength of the light source in accordance with a second input signal so as to stabilize the light strength;

second optical coupling means for dividing the output signal from the first optical coupling means;

photodetector means for converting the light strength of an output signal from the second optical coupling means into a second electrical signal; and second proportional/integration means for detecting a proportional value of the output signal from the photodetector means, integrating the detected proportional value, and generating the second input signal for the current control means.

2. The apparatus of claim 1, wherein said light source is a distributed feedback laser.

3. A method for stabilizing the wavelength and light strength of a light output by a multichannel light source, said method comprising (a) setting a temperature and a current of the multichannel light source;

(b) detecting the wavelength and the light strength of the light output by the multichannel light source;

(c) verifying whether the detected wavelength and the detected light strength are equal to a preset light wavelength and a preset light strength, respectively, at the set temperature and the set current;

(d) resetting the temperature and the current when the detected wavelength and the detected light strength are not equal to the reset wavelength and the preset light strength, respectively; and (e) maintaining the temperature and the current when the detected wavelength and the detected light strength are equal to the preset wavelength and the preset light strength, respectively.

* * * * *